United States Patent

Atherton

(10) Patent No.: US 8,571,798 B2
(45) Date of Patent: Oct. 29, 2013

(54) SYSTEM AND METHOD FOR MONITORING FLUID FLOW THROUGH AN ELECTRICAL SUBMERSIBLE PUMP

(75) Inventor: Eric Atherton, Witney (GB)

(73) Assignee: Baker Hughes Incorporated, Houston, TX (US)

( * ) Notice: Subject to any disclaimer, the term of this patent is extended or adjusted under 35 U.S.C. 154(b) by 623 days.

(21) Appl. No.: 12/715,499

(22) Filed: Mar. 2, 2010

(65) Prior Publication Data

US 2010/0228502 A1 Sep. 9, 2010

Related U.S. Application Data

(60) Provisional application No. 61/156,971, filed on Mar. 3, 2009.

(51) Int. Cl.
*G01N 15/08* (2006.01)
*F04B 49/06* (2006.01)

(52) U.S. Cl.
USPC .......................................... 702/12; 417/44.11

(58) Field of Classification Search
USPC ........... 702/12, 1–2, 6, 11, 13–14, 33, 47, 50, 702/57, 60–62, 64–65, 81, 84, 127, 702/130–131, 138, 182–183, 188–189; 73/1.16, 1.35, 1.57, 152.18–152.19, 73/152.21–152.22, 152.29, 152.31, 73/152.51, 202.5, 700, 751, 753, 861, 73/861.01–860.02; 166/66, 66.4, 65.1, 166/244.1, 250.01; 318/117, 565; 415/15, 415/17, 23, 26, 118; 417/42–43, 45, 417/44.2–44.3, 44.11, 48, 53, 56–58, 375, 417/390, 410.1, 411
See application file for complete search history.

(56) References Cited

U.S. PATENT DOCUMENTS

| | | | |
|---|---|---|---|
| 4,016,759 A | 4/1977 | Baker et al. | |
| 4,270,386 A | 6/1981 | Hawk et al. | |
| 4,464,932 A | 8/1984 | Ewing et al. | |
| 5,048,332 A | 9/1991 | Ishikawa et al. | |
| 5,226,333 A | 7/1993 | Hess | |
| 5,318,409 A | 6/1994 | London et al. | |
| 5,353,646 A | 10/1994 | Kolpak | |
| 5,610,331 A | 3/1997 | Georgi | |
| 6,167,965 B1 * | 1/2001 | Bearden et al. | 166/250.15 |

(Continued)

OTHER PUBLICATIONS

Cohen, D. J., Captain Field Electric Submersible Pump, Condition Monitoring and Completion Systems, May 5-8, 1997, Offshore Technology Conference, pp. 157-173.*

(Continued)

*Primary Examiner* — Toan Le
(74) *Attorney, Agent, or Firm* — Cantor Colburn LLP

(57) ABSTRACT

A system for monitoring a condition of a downhole electrical submersible pump (ESP) assembly is disclosed. The system includes: a downhole assembly configured to be disposed in a wellbore in an earth formation; the ESP assembly connected to the downhole assembly and including a motor and a pump, the ESP assembly in electrical communication with a surface electrical source via a conductor; a power gauge unit configured to measure the electrical power supplied to the ESP assembly; and a processor configured to receive data from the power gauge unit and calculate a flowrate of the ESP assembly based on at least the electrical power supplied to the ESP assembly. Also disclosed is a method of monitoring a condition of a downhole ESP assembly.

18 Claims, 3 Drawing Sheets

(56) References Cited

U.S. PATENT DOCUMENTS

2007/0046115 A1  3/2007  Tetzlaff et al.
2007/0252717 A1  11/2007  Fielder
2007/0272406 A1  11/2007  McCoy et al.

OTHER PUBLICATIONS

Aksoy, N., Optimization of Downhole Pump Settings Depths in Liquid-Dominated Geothermal Systems: A Case Study on the Balcova-Narlidere Field, Turkey, 2007, Geothermics 36, pp. 436-458.*

Bremner et al., Evolving Technologies: Electrical Submersible Pumps, Winter 2006/2007, Oilfield Review, pp. 30-43.*

Electrical Submersible Pump Analysis and Design, Case Services, Inc. May 30, 2001. 23 pages.

JP2002333357. "Thermal Mass Flowmeter for Liquid". Publication Date: Nov. 22, 2002. Abstract Only.

RO118149. "Electronic System for Metering the Thermal Energy and the Fluid Flow" Publication Date: 2003-02-28. Abstract Only.

RU2152599, "Heat Counter-Flowmeter". Publicatoin Date: Jul. 10, 2000. Abstract Only.

RU2182319. "Heat Counter-Flowmeter". Publication Date: May 10, 2002. Abstract Only.

Notification of Transmittal of the International Search Report and the Written Opinion of the International Searching Authority, or the Declaration; PCT/US2010/026055; Aug. 13, 2010.

Written Opinion of the International Searching Authority; PCT/US2010/026055; Aug. 13, 2010.

* cited by examiner

SYSTEM AND METHOD FOR MONITORING FLUID FLOW THROUGH AN ELECTRICAL SUBMERSIBLE PUMP

BACKGROUND

Electrical submersible pump systems (ESPs) are utilized in hydrocarbon exploration to assist in the removal of hydrocarbon-containing fluid from a formation and/or reservoir. Such ESP systems are disposed downhole in a wellbore, and are consequently exposed to harsh conditions and operating parameters that can have a significant effect on system performance and useful life of the ESP.

It is important to monitor the flow of an ESP close to the ESP (rather than at the surface) for many reasons. One important reason is to get an immediate indication if fluid is not flowing through the ESP. As the ESP is cooled by the fluid that it pumps, it is essential to determine low or absent flow quickly if it occurs, so the ESP can be stopped before the ESP burns out due to overheating. Another reason is if there are several ESPs that are in the same well, producing from multiple producing zones. In this case a downhole flowmeter is required if allocation of produced fluid is required between zones. A further reason for monitoring flow downhole is if a surface or subsea flowmeter is not possible, or expensive.

During fluid removal or other processes, flow contributions are typically monitored at various depths in a well. Such monitoring can be provided by wireline-conveyed downhole flowmeters that are temporarily installed in the well for a period of time such as hours or days.

More recently, permanently installed downhole flowmeters have been deployed in certain wells, where surface or subsea flow measurement is difficult. Such permanently installed flowmeters typically use the venturi principle, measuring the reduction of pressure at the throat of the venturi to determine flowrate. One disadvantage of venturi flowmeters is the need to restrict the flow at the venturi. This will cause a certain amount of pressure loss, even in a well designed venturi. Any pressure loss in the flowmeter results in reduced oil flow, and/or increased pumping costs. Other flowmeters, such as turbine flowmeters, are less popular in permanent installations, primarily due to the unreliability of downhole moving parts and bearings.

For surface flow measurement, particularly for the measurement of the flow of low flowrate gases, energy-balance, or "thermal flowmeters" are well known. One type first measures the temperature of a fluid flowing along a pipe. The fluid is then heated, and finally the temperature of the fluid is measured again after flowing through the heated section. The flowrate in the pipe can be calculated from the increase in fluid temperature, provided the volumetric heat capacity of the fluid is known, and the power of the heater.

$$\text{Flowrate} = \text{Heater\_Power}/[(T\text{out}-T\text{in})*Cv].$$

"Heater_Power" is measured in Watts (W), "Tout" is the fluid temperature after flowing through the heated section in degrees Celsius (C), "Tin" is the fluid temperature prior to heating in degrees Celsius (C), "Cv" is the volumetric heat capacity of the fluid measured in Watts/meters3*C (W/m^3/C), and the Flowrate is measured in m^3/sec This formula is an energy-balance equation. For any given time, for a stable flowrate, the electrical energy delivered to the heater must equal the increase in heat energy in the fluid flowing through the heated section of the pipe, assuming the heater is externally well insulated, so that all the electrical energy supplied to the heater is delivered to the flowing fluid, with negligible amount leaking to the surrounding environment.

SUMMARY

A system for monitoring a condition of a downhole electrical submersible pump (ESP) assembly includes: a downhole assembly configured to be disposed in a wellbore in an earth formation; an ESP assembly connected to the downhole assembly and including a motor and a pump, the ESP assembly being in electrical communication with a surface electrical source via a conductor; a power gauge unit configured to measure the electrical power supplied to the ESP assembly; and a processor configured to receive data from the power gauge unit and calculate a flowrate of the ESP assembly based on at least the electrical power supplied to the ESP assembly.

A method of monitoring a condition of a downhole electrical submersible pump (ESP) assembly includes: disposing the ESP assembly in a wellbore in an earth formation, the ESP assembly including a motor and a pump, the ESP assembly in electrical communication with a surface electrical source; pumping wellbore fluid through a production conduit via the ESP assembly; measuring an electrical power supplied to the ESP assembly; and calculating a flowrate of the ESP based on at least the electrical power supplied to the ESP assembly.

BRIEF DESCRIPTION OF THE DRAWINGS

Referring now to the drawings, wherein like elements are numbered alike in the several Figures.

DETAILED DESCRIPTION OF EXEMPLARY EMBODIMENTS

Figure 1:
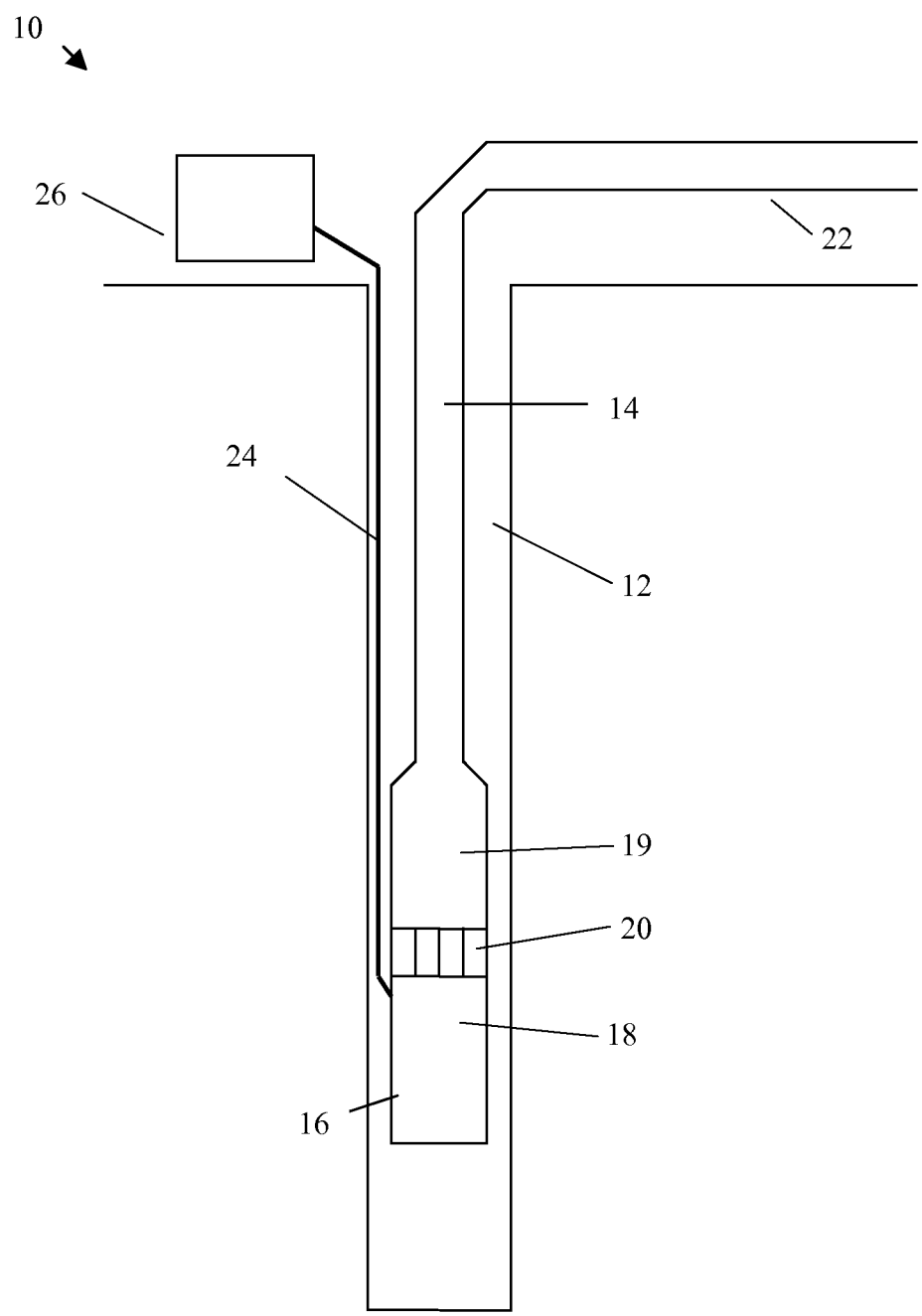
FIG. 1 is a cross-sectional view of an embodiment of a hydrocarbon production system.

Referring to FIG. 1, an exemplary embodiment of a hydrocarbon production system 10 disposed in a wellbore 12 is shown. A production string 14 is shown disposed in a wellbore 12 that penetrates at least one earth formation for extracting matter from the formation and/or making measurements of properties of the formation and/or the wellbore 12 downhole. The production string 14 is made from, for example, a pipe, multiple pipe sections or flexible tubing. The hydrocarbon production system 10 also includes an electrical submersible pump (ESP) assembly 16 connected to the production string 14, for example, in a bottomhole assembly (BHA). The ESP assembly 16 is utilized to pump production fluid through the production string 14 to the surface. A motor 18 drives a pump 19 in the ESP assembly 16, which takes fluid (typically an oil/water mixture) in at an inlet 20, and discharges it at increased pressure into the production string 14. The fluid flows to the surface, eventually into a flowline 22, and on to a surface processing facility. The motor 18 is supplied with electrical power via an electrical conductor such as a downhole power cable 24, which is operably connected to a surface motor power supply system 26. An example of the cable 24 is as a three-phase power cable.

Figure 2:
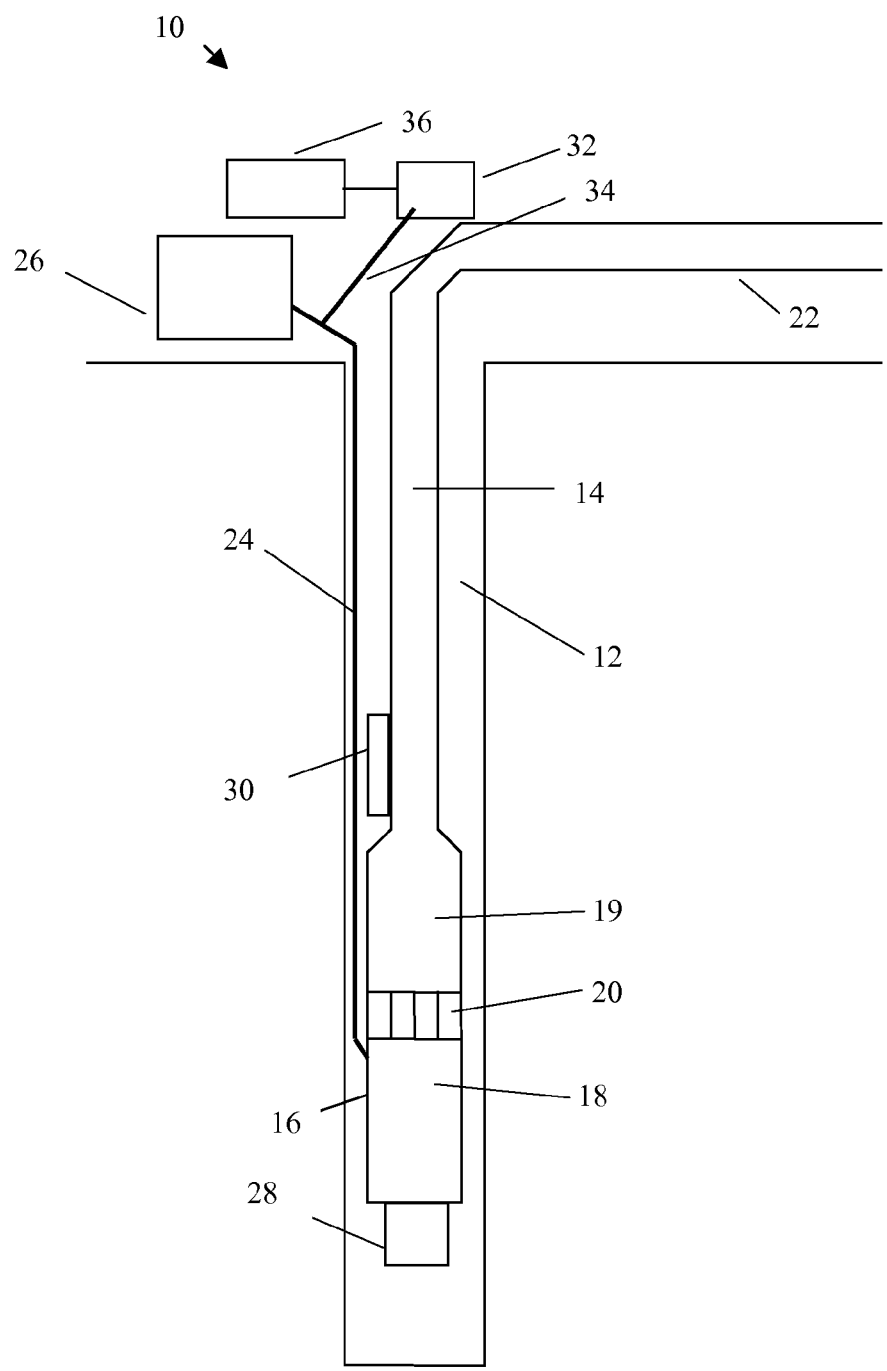
FIG. 2 is a cross-sectional view of an embodiment of a hydrocarbon production system including a thermal flowmeter system.

Referring to FIG. 2, the ESP assembly 16 includes a thermal flowmeter system. The thermal flowmeter system is an energy balance thermal flowmeter system configured to be deployed to measure the flow of fluids through the ESP. The thermal flowmeter system estimates or measures fluid flow through the ESP by using an estimation or measurement of the electrical power delivered to the ESP.

In one embodiment, a surface instrumentation package or power gauge unit 32 is connected to the downhole power cable 24 via, for example, a monitor cable 34. The power gauge unit 32 is configured to compute the electrical power being delivered to the top of the downhole cable 24 by measuring voltages, currents and/or (in the event of A/C power system) phase angle. In one embodiment, an intake instrumentation package 28 is physically located, for example, downhole relative to the motor 18, and a discharge instrumentation package 30 is physically located, for example, uphole relative to the motor 18. The instrumentation packages 28 and 30 may include one or more sensors for measuring fluid temperature and/or pressure before (e.g., downhole) and after (e.g., uphole) the ESP assembly 16. A surface computer or other processor 36 receives measurement data from all three instrumentation packages, i.e., the power gauge unit 32, the intake instrumentation package 28 and the discharge instrumentation package 30. In one embodiment, the power gauge unit 32 is directly connected to the computer 36. In another embodiment, the power gauge unit 32 is incorporated in the surface computer 36. Data from the downhole instrumentation packages are transmitted to the computer 36 on the surface, via the downhole power cable 24 or by any other suitable transmission techniques. The surface computer 36 uses a combination of measurements from all three instrumentation packages to compute the flowrate. The specific number and configuration of processing units and computers is exemplary. Any number or configuration of processors may be used to collect data and calculate flowrate.

As described herein, "wellbore" refers to a single hole that makes up all or part of a drilled well. As described herein, "formations" refer to the various features and materials that may be encountered in a subsurface environment. Accordingly, it should be considered that while the term "formation" generally refers to geologic formations of interest, that the term "formations," as used herein, may, in some instances, include any geologic points or volumes of interest (such as a survey area). In addition, it should be noted that "string" as used herein, refers to any structure suitable for lowering a completion assembly containing an ESP through a wellbore, and is not limited to the structure and configuration described herein. As used herein, an "upper" or "uphole" location refers to a location along a length of the wellbore 12 that is closer to the surface than a reference location. Likewise, a "lower" or "downhole" location refers to a location along the length of the wellbore 12 that is further away from the surface than the upper location or a reference location.

In one embodiment, the ESP assembly 16 is disposed in the production system 10 at or near the downhole portion of the production string 14.

The ESP assembly includes any type of the pump 19 suitable for pumping production fluid. Examples of such types include a centrifugal pump having a number of stages, each having an impeller and a diffuser, or progressing cavity pump. In one embodiment, the motor 18 is a three-phase AC motor.

The intake and discharge instrumentation packages 28 and 30 are equipped with transmission equipment to communicate ultimately to the surface computer 36. Such transmission equipment may take any desired form, and different transmission media and connections may be used. In one embodiment, the discharge instrumentation package 30 communicates to the intake instrumentation package 28 through a tubular encased conductor (TEC cable) that includes a centralized conductor or conductors encapsulated in a stainless steel or other steel jacket. In this embodiment, the intake instrumentation package 28 communicates to the surface by sending its signals, and also those of the discharge instrumentation package 30, through the motor 18 and the power cable 24, ultimately to the surface computer 36. In another embodiment, the intake instrumentation package 28 communicates to the discharge instrumentation package 30 via a TEC cable, and the discharge instrumentation package 30 communicates to the surface computer 36 via the TEC cable.

In one embodiment, the surface computer 36, the instrumentation packages 28, 30, and/or the power gauge unit 32 include components as necessary to provide for storing and/or processing data. Exemplary components include, without limitation, at least one processor, storage, memory, input devices, output devices and the like. The surface computer 36 may optionally be configured to control the speed of the ESP assembly 16.

In one embodiment, the energy-balance thermal flowmeter system described herein utilizes the ESP assembly 16 as the fluid heating element of a thermal flowmeter system. Note that "ESP", as described herein, includes other downhole pump types, such as progressive cavity pumps or any downhole electrical motor driving a downhole pump.

The system measures the electrical energy delivered to the motor. In one embodiment, the energy delivered to the motor is measured at the surface, such as by the power gauge unit 32, with appropriate losses taken into account for energy lost in the downhole cable 24 to the motor 18. The instrumentation packages 28, 30 are included to measure the fluid temperature before and after the ESP ("heater") assembly 16. In addition, the pressure of the fluid before and after the ESP assembly 16 may be measured.

In one embodiment, the heat lost to the formation is measured. In one embodiment, the heat lost to the formation is a relatively small error term, and can be approximately calculated, given the geometry of the well around the ESP assembly 16 and knowledge of the formation.

In one embodiment, the fundamental energy balance equation utilized by the system is the following:

$$We = Wc + Wt + Wp + Wf,$$

where "We" is electrical power (in Watts) as measured at the surface or at another selected location and delivered to the downhole cable, "Wc" is the electrical power loss (in Watts) in the downhole cable, "Wt" is the heat energy delivered to the fluid flow every second, "Wp" is the pressure potential energy delivered to the flowing fluid every second, and "Wf" is the heat energy lost into the formation every second.

In one embodiment, the computer 36 measures temperature, pressure and/or electric power and calculates the flow rate in real-time to produce a real-time flowrate that can be used directly in ESP speed control, and also sent to conventional control systems such as Supervisory Control And Data Acquisition (SCADA) systems for monitoring, performance optimisation, and control. "Real-time" data may refer to data generated upon or shortly after detection and/or acquisition by the sensors. This information may then be used in order to influence interventions or to provide additional safety measures. Such real time calculations are described below.

In one embodiment, the volumetric flowrate "Q" in meters$^3$/second (m$^3$/sec) is calculated using the following equation:

$$Q = (We - Wc - Wf) / [(Td - Ti) * Cvf + Pd + Ph - Pi],$$

where "Td" is the discharge fluid temperature (in degrees C.) measured by the discharge instrumentation package 30, and "Ti" is the intake fluid temperature (in degrees C.) measured by the intake instrumentation package 28. "Cvf" is the volumetric fluid heat capacity (in $J/m^3C$). "Pd", "Ph", and "Pi" are the discharge pressure, the pressure head (pressure between discharge and intake due to the fluid column between these two points), and the intake pressure, respectively, each of which are measured in Pascals (Pa).

In one embodiment, electrical power (We) in Watts (W) is measured at the surface, and can be derived from the measured current ("I") in Amps (A) and voltage ("V") in Volts (V) by the following equation:

$$We=I*V$$

The power loss in the cable (Wc) can be calculated from the downhole cable resistance ("R") and the current by the following equation:

$$Wc=I^2*R,$$

where R is measured in ohms.

The heat lost to the formation every second (Wf), can be calculated from the thermal conductivity of the formation, the geometry of the wellbore 12, and the temperature rise of the ESP assembly 16 above the natural formation temperature. Alternatively, this parameter can be calculated by the rate of cooling of the ESP assembly 16 when it is switched off after a long period of operation or after any selected period of operation. The thermal heat capacity of the ESP assembly 16 can be calculated from the weight of the ESP assembly 16 multiplied by the specific heat capacity of steel (or other material from which the assembly is made), as shown in the following equation:

$$Wf=Rt*Mesp*Cs,$$

where "Rt" is the instantaneous rate of cooling (in C/second) after ESP switch off, "Mesp" is the mass of the ESP assembly 16 in kilograms (kg) and "Cs" is the heat capacity of steel in J/[kgC].

The pressure head (Ph) is the pressure generated by the weight of the fluid column between the intake and discharge pressure sensors, and can be represented by the following equation:

$$Ph=L*D*g*\cos(\text{deviation}),$$

where "L" is the length (in meters) between intake and discharge pressure sensors, "D" is the fluid density (in $kg/m^3$), "g" is the local gravity (in $m/s^2$) and "deviation" is the deviation (in degrees) of the wellbore 12 from the vertical at the pump 19.

The volumetric heat capacity can be calculated using the following equation:

$$Cvf=WC*Cvw+(1-WC)*Cvo,$$

where "WC" is the water cut (dimensionless), "Cvw" is the volumetric heat capacity of water (in $J/m^3C$) and "Cvo" is the volumetric heat capacity of oil ($J/m^3C$). Note that Cvw is generally approximately twice the value of Cvo.

The volumetric heat capacity "Cvw" is significant in the flowrate calculation, as there is approximately a ratio of 2:1 between the volumetric heat capacity of oil and water, so the calculated flowrate is sensitive to "water cut", defined as the water volume as a fraction of the total fluid volume. A reasonable value for water cut can generally be obtained relatively easily on the surface through occasional sampling of the production fluid. As a consequence of the sensitivity to water cut, it should be noted, that when combined with another flowmeter (such as a venturi flowmeter), the thermal flowmeter can in fact be used as a sensitive water cut meter if the downhole flow is known from the alternative flowmeter. This may be a power combination for certain wells.

The flowrate calculation is insensitive to the difference in density between water and oil, as typically this difference is only of the order of 10%, and in any case, the density of the production fluid only appears in the relatively small pressure head calculation (Ph.)

It should be noted that the measurement units utilized in the above equations are exemplary. Other units as desired or needed may be used in measuring or estimating the above parameters and calculated values.

Figure 3:
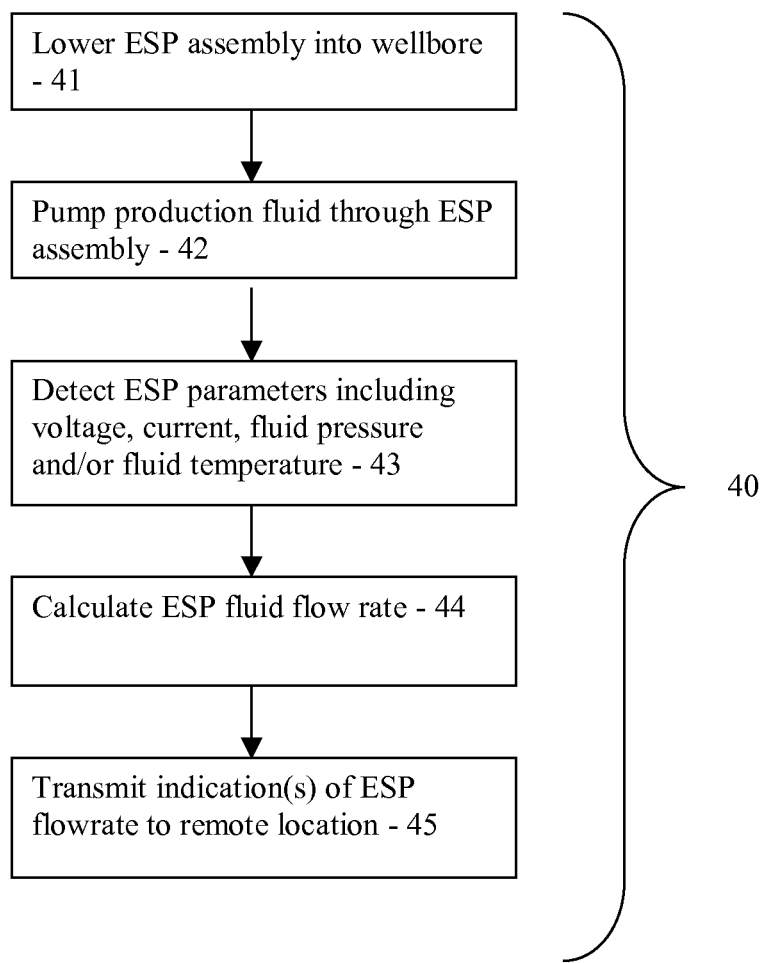
FIG. 3 is a flow chart illustrating a method of monitoring a condition of a downhole electrical submersible pump (ESP) assembly.

FIG. 3 illustrates a method 40 of monitoring a condition of a downhole electrical submersible pump (ESP) assembly. The method 40 includes one or more of stages 41-45 described herein. The method may be performed continuously or intermittently as desired. The method is described herein in conjunction with the ESP assembly 16, although the method may be performed in conjunction with any number and configuration of processors, sensors and tools. The method may be performed by one or more processors or other devices capable of receiving and processing measurement data, such as the surface computer 36, the power gauge unit 32, and/or the instrumentation packages 28, 30. In one embodiment, the method includes the execution of all of stages 41-45 in the order described. However, certain stages 41-45 may be omitted, stages may be added, or the order of the stages changed.

In the first stage 41, the ESP assembly 16 is lowered into the wellbore 12.

In the second stage 42, production fluid is pumped through the ESP assembly 16 and through the production string 14 to a surface location.

In the third stage 43, one or more of various parameters associated with the ESP assembly 16 are detected. Such parameters include, for example, a fluid temperature at a first location and a second location along the wellbore 12, fluid pressure and power supplied to the ESP assembly 16.

In the fourth stage 44, the fluid flow rate through the ESP assembly 16 is calculated based on one or more of the various parameters of the ESP assembly. In one embodiment, if the fluid flowrate is known, such as by measuring fluid flowrate by an additional flowmeter (such as a venturi flowmeter), the water cut of the fluid is calculated.

In one embodiment, a mathematical model is utilized to calculate a fluid flow rate through the ESP assembly 16 based on the difference between the measured temperatures, fluid pressure and/or power supplied to the ESP assembly 16.

In the fifth stage 45, indications of the ESP flowrate are transmitted to a remote location such as the oil company office. through a SCADA system The systems and methods described herein provide various advantages over prior art techniques. The systems and methods provide a simple and cost effective flowmeter for monitoring the flow of an ESP (or any downhole pump using an electric motor), which has no moving parts and no flow restrictions. Furthermore, the systems and methods avoid the need for installing a power cable into the well, and avoid the actual cost of the electrical power required to run an energy-balance thermal flowmeter, which could be prohibitive.

In contrast to conventional flow meters, such as venturi flowmeters, there is no need for a flow restriction inside the flowmeter, which will cause a certain amount of pressure loss. Such pressure loss is particularly undesirable in an ESP well, as an ESP is specifically placed in the well because the downhole pressure is not sufficient to provide the required fluid flow to surface. Any pressure loss in the flowmeter results in reduced oil flow, and/or increased pumping costs. The systems and methods described herein overcome this limitation.

The systems and methods described herein also substantially reduce the cost relative to deploying a conventional thermal flowmeter with an internal heater, into an oil well. The systems and methods described herein create a thermal flowmeter utilizing the existing ESP as the fluid heating element of the flow measurement system. As a result, no additional energy is required to achieve fluid flowrate measurements using the thermal flowmeter principle.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a power supply (e.g., at least one of a generator, a remote supply and a battery), sensor, electrode, transmitter, receiver, transceiver, controller, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for monitoring a condition of a downhole electrical submersible pump (ESP) assembly, the system comprising:
a downhole assembly configured to be disposed in a wellbore in an earth formation;
the ESP assembly connected to the downhole assembly and including a motor and a pump, the ESP assembly in electrical communication with a surface electrical source via a conductor;
a power gauge unit configured to measure an electrical power supplied to the ESP assembly; and
a processor configured to receive data from the power gauge unit and calculate a flowrate of the ESP assembly based on at least the electrical power supplied to the ESP assembly, wherein at least one of the processor and the power gauge unit is configured to correct the measured electrical power due to power loss between the remote location and the ESP assembly to generate a corrected measured electrical power, and the at least one of the processor and the power gauge unit is configured to calculate the flowrate of the ESP based on the corrected measured electrical power.

2. The system of claim 1, further comprising at least one ESP gauge unit connected to the ESP assembly, the ESP gauge unit including at least one of a temperature sensor and a pressure sensor.

3. The system of claim 2, wherein the processor is configured to calculate the flowrate based on at least the electrical power supplied to the ESP assembly, an intake fluid temperature, an intake pressure, a discharge fluid temperature and a discharge fluid pressure.

4. The system of claim 3, wherein the processor is configured to calculate the flowrate based on the following equation:

$$Q=(We-Wc-Wf)/[(Td-Ti)Cvf+Pd+Ph-Pi],$$

wherein "We" is electrical power as measured by the power gauge unit, "Wc" is electrical power loss between the power gauge unit and the ESP assembly, "Wf" is heat energy lost into the formation, "Td" is the discharge fluid temperature, "Ti" is the intake fluid temperature, "Cvf" is a volumetric fluid heat capacity, and "Pd", "Ph", and "Pi" are a discharge pressure, a pressure head, and an intake pressure, respectively.

5. The system of claim 2, wherein the at least one ESP gauge unit includes:
an intake gauge unit including a first temperature sensor, the intake gauge unit disposed at a first end of the ESP assembly; and
a discharge gauge unit including a second temperature sensor, the discharge gauge unit disposed at a second end of the ESP assembly.

6. The system of claim 5, wherein the intake gauge unit also includes a first pressure sensor, and the discharge gauge unit also includes a second pressure sensor.

7. The system of claim 1, wherein the power gauge unit is located at a remote location relative to the ESP assembly and is electrically connected to the conductor.

8. The system of claim 7, wherein the remote location is a surface location.

9. A method of monitoring a condition of a downhole electrical submersible pump (ESP) assembly, the method comprising:
disposing the ESP assembly in a wellbore in an earth formation, the ESP assembly including a motor and a pump, the ESP assembly in electrical communication with a surface electrical source;
pumping wellbore fluid through a production conduit via the ESP assembly;
measuring an electrical power supplied to the ESP assembly; and calculating a flowrate of the ESP based on at least the electrical power supplied to the ESP assembly and a loss of heat in the wellbore fluid to an earth formation.

10. The method of claim 9, wherein calculating the flowrate includes calculating the flowrate based on an intake fluid temperature, a discharge fluid temperature and a fluid pressure.

11. The method of claim 10, wherein calculating the flowrate includes calculating the flowrate based on the following equation:

$$Q=(We-Wc-Wf)/[(Td-Ti)Cvf+Pd+Ph-Pi],$$

wherein "We" is electrical power as measured by the power gauge unit, "Wc" is electrical power loss between the power gauge unit and the ESP assembly, "Wf" is heat energy lost into the formation, "Td" is the discharge fluid temperature, "Ti" is the intake fluid temperature, "Cvf" is a volumetric fluid heat capacity, and "Pd", "Ph", and "Pi" are a discharge pressure, a pressure head, and an intake pressure, respectively.

12. The method of claim 9, wherein measuring the electrical power includes measuring the electrical power at a surface location and correcting the measured electrical power due to power loss between the surface location and the ESP assembly.

13. The method of claim 9, wherein the loss of heat is calculated based on a geometry of the wellbore, a thermal conductivity of the formation, and a temperature difference between the ESP assembly and the formation at a depth of the ESP.

14. The method of claim 9, wherein the loss of heat is calculated based on a heat capacity of the ESP assembly and a rate of temperature drop when the ESP assembly is turned off after the ESP assembly is operated for a selected period of time.

15. The method of claim 9, further comprising calculating a water cut of the wellbore fluid based on the flowrate.

16. The method of claim 15, wherein calculating the water cut includes measuring a second flowrate via on a second flowmeter disposed in fluid communication with the wellbore fluid.

17. The method of claim 9, further comprising measuring at least one of a temperature and a pressure.

18. The method of claim 17, further comprising measuring at least one of a temperature and a pressure via an intake gauge unit disposed at a first end of the ESP assembly and a discharge gauge unit disposed at a second end of the ESP assembly.

* * * * *